(12) United States Patent
Mizuno et al.

(10) Patent No.: US 7,409,508 B2
(45) Date of Patent: *Aug. 5, 2008

(54) DISK ARRAY SYSTEM CAPABLE OF TAKING OVER VOLUMES BETWEEN CONTROLLERS

(75) Inventors: Yoichi Mizuno, Tokyo (JP); Naoto Matsunami, Tokyo (JP); Yasuyuki Mimatsu, Tokyo (JP); Kenichi Takamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 11/215,157

(22) Filed: Aug. 29, 2005

(65) Prior Publication Data

US 2005/0283569 A1     Dec. 22, 2005

Related U.S. Application Data

(63) Continuation of application No. 11/090,367, filed on Mar. 24, 2005, now Pat. No. 6,950,920, which is a continuation of application No. 10/079,999, filed on Feb. 19, 2002, now Pat. No. 6,880,059.

(30) Foreign Application Priority Data

Nov. 28, 2001   (JP)   ............................. 2001-362858

(51) Int. Cl.
  *G06F 13/00*   (2006.01)
(52) U.S. Cl. ........................................ 711/154; 711/112
(58) Field of Classification Search ........................ None
  See application file for complete search history.

(56) References Cited

U.S. PATENT DOCUMENTS

| 5,140,592 A | 8/1992 | Idleman et al. | |
|---|---|---|---|
| 5,483,640 A | 1/1996 | Isfeld et al. | |
| 5,546,535 A * | 8/1996 | Stallmo et al. | 714/9 |
| 5,712,970 A * | 1/1998 | Arnott et al. | 714/6 |
| 6,073,218 A | 6/2000 | DeKoning et al. | |
| 6,148,414 A * | 11/2000 | Brown et al. | 714/9 |
| 6,154,850 A | 11/2000 | Idleman et al. | |
| 6,412,078 B2 | 6/2002 | Murotani et al. | |
| 6,625,691 B2 | 9/2003 | Obara et al. | |

(Continued)

FOREIGN PATENT DOCUMENTS

JP      09-146842 A     6/1999

(Continued)

*Primary Examiner*—B. James Peikari
(74) *Attorney, Agent, or Firm*—Townsend and Townsend and Crew LLP

(57) ABSTRACT

A disk array system of the type that each controller has an independent and dedicated cache. The disk array system can change control of a desired volume between desired controllers without suspending the system. When volumes are taken over between controllers, a switch-source controller de-stages data of a subject volume on the data cache to a storage subject disk to maintain the disk content reflection (coherency). Even if each controller has an independent and dedicated cache, a desired volume can be taken over between desired controllers without suspending the system. Each controller has a configuration manager which stores the controller number of a switch-destination controller to allow automatic volume take-over and automatic control by the original controller.

7 Claims, 10 Drawing Sheets

U.S. PATENT DOCUMENTS

| | | | |
|---|---|---|---|
| 6,654,831 B1 | 11/2003 | Otterness et al. | |
| 6,880,059 B2 * | 4/2005 | Mizuno et al. | 711/170 |
| 6,950,920 B1 * | 9/2005 | Mizuno et al. | 711/170 |
| 2003/0188045 A1 | 10/2003 | Jacobson | |

FOREIGN PATENT DOCUMENTS

| | | |
|---|---|---|
| JP | 11-296313 A | 10/1999 |
| JP | 11-312058 A | 11/1999 |
| JP | 2001-051809 A | 2/2001 |

* cited by examiner

FIG. 2

CONFIGURATION INFORMATION TABLE — 1121

| INTERNAL LUN | EXTERNAL LUN | PORT NUMBER | CONTROLLER NUMBER | | BLOCK NUMBER | RAID GROUP NUMBER | RAID LEVEL | PHYSICAL ADDRESS INFORMATION |
| --- | --- | --- | --- | --- | --- | --- | --- | --- |
| | | | DEFAULT | CURRENT | | | | |
| ... | ... | ... | ... | ... | ... | ... | ... | ... |

FIG. 5A

CONFIGURATION TABLE BEFORE TAKE-OVER                                    1121 x

| INTERNAL LUN | EXTERNAL LUN | PORT NUMBER | CONTROLLER NUMBER | | BLOCK NUMBER | RAID GROUP NUMBER | RAID LEVEL | PHYSICAL ADDRESS INFORMATION |
|---|---|---|---|---|---|---|---|---|
| | | | DEFAULT | CURRENT | | | | |
| 0 | 1 | 0 | 0 | 0 | ⋮ | ⋮ | ⋮ | ⋮ |
| 1 | 3 | 0 | 0 | 0 | ⋮ | ⋮ | ⋮ | ⋮ |
| 2 | 0 | 1 | 0 | 0 | ⋮ | ⋮ | ⋮ | ⋮ |
| 3 | 2 | 1 | 0 | 0 | ⋮ | ⋮ | ⋮ | ⋮ |

FIG. 5B

CONFIGURATION TABLE AFTER TAKE-OVER                                     1121 x

| INTERNAL LUN | EXTERNAL LUN | PORT NUMBER | CONTROLLER NUMBER | | BLOCK NUMBER | RAID GROUP NUMBER | RAID LEVEL | PHYSICAL ADDRESS INFORMATION |
|---|---|---|---|---|---|---|---|---|
| | | | DEFAULT | CURRENT | | | | |
| 0 | 1 | 0 | 0 | 0 | ⋮ | ⋮ | ⋮ | ⋮ |
| 1 | 3 | 0 | 0 | 0 | ⋮ | ⋮ | ⋮ | ⋮ |
| 2 | 0 | 0 | 1 | 1 | ⋮ | ⋮ | ⋮ | ⋮ |
| 3 | 2 | 0 | 1 | 1 | ⋮ | ⋮ | ⋮ | ⋮ |

FIG. 9A

CONFIGURATION TABLE BEFORE TAKE-OVER                                1121x

| INTERNAL LUN | EXTERNAL LUN | PORT NUMBER | CONTROLLER NUMBER | | BLOCK NUMBER | RAID GROUP NUMBER | RAID LEVEL | PHYSICAL ADDRESS INFORMATION |
|---|---|---|---|---|---|---|---|---|
| | | | DEFAULT | CURRENT | | | | |
| 0 | 0 | 0 | 0 | 0 | ⋮ | ⋮ | ⋮ | ⋮ |
| 1 | 1 | 0 | N | 0 | ⋮ | ⋮ | ⋮ | ⋮ |
| 2 | 1 | 0 | 1 | 1 | ⋮ | ⋮ | ⋮ | ⋮ |
| 3 | 2 | 0 | N | 1 | ⋮ | ⋮ | ⋮ | ⋮ |

FIG. 9B

CONFIGURATION TABLE AFTER TAKE-OVER                                 1121x

| INTERNAL LUN | EXTERNAL LUN | PORT NUMBER | CONTROLLER NUMBER | | BLOCK NUMBER | RAID GROUP NUMBER | RAID LEVEL | PHYSICAL ADDRESS INFORMATION |
|---|---|---|---|---|---|---|---|---|
| | | | DEFAULT | CURRENT | | | | |
| 0 | 0 | 0 | 0 | 0 | ⋮ | ⋮ | ⋮ | ⋮ |
| 1 | 1 | 0 | 0 | N | ⋮ | ⋮ | ⋮ | ⋮ |
| 2 | 1 | 0 | 1 | 1 | ⋮ | ⋮ | ⋮ | ⋮ |
| 3 | 2 | 0 | 1 | N | ⋮ | ⋮ | ⋮ | ⋮ |

DISK ARRAY SYSTEM CAPABLE OF TAKING OVER VOLUMES BETWEEN CONTROLLERS

BACKGROUND OF THE INVENTION

The present invention relates to a disk array system and a take-over method for logical units between controllers, and more particularly to a disk array system each of whose controllers has a dedicated cache and a take-over method for logical units between controllers.

A conventional disk array system has a plurality of disks and controllers and a shared cache accessible by each controller.

FIG. 10 is a block diagram showing the structure of a disk array system having a shared cache according to conventional techniques. Conventional techniques will be described with reference to FIG. 10. In FIG. 10, reference numeral 100 represents a large disk array apparatus, reference symbol 200$x$ ($x=a, \ldots, n$) represents controllers, reference numeral 300 represents an expensive shared cache, reference numeral 400 represents a shared memory, reference symbol 500$x$ ($x=a, \ldots, n$) represents disk apparatuses, and reference numeral 600 represents a common bus.

The disk array apparatus 100 shown in FIG. 10 constitutes a disk array system together with other computers (not shown). The disk array apparatus is constituted of a plurality of controllers 200$x$ for controlling disk apparatuses, the shared cache 300 for storing input and output data, the shared memory 400 for storing configuration information or the like, a plurality of disc apparatuses 500$x$, and the common bus 600 interconnecting these constituent elements. The shared cache 300 and shared memory 400 can be accessed from any controller 200$x$ via the common bus 600. As the shared cache 300, an expensive and large capacity cache is prepared because accesses from all the controllers 200$x$ are concentrated upon this cache. Each controller 200$x$ is assigned a predetermined disk apparatus 500$x$. The disk array system is connected to a HOST.

With this configuration by conventional techniques, after a disc apparatus 500$x$ under control of one controller 200$x$ is switched to another controller 200$x$, the destination controller uses input/output data of the source controller stored in the shared cache 300 to change the relation between the disc apparatus 500$x$ and the destination controller 200$x$. Since configuration information and the like of the disc apparatus necessary for take-over is stored in the shared memory 400, the destination controller refers to the shared memory 400 to start controlling the disk apparatus. The source controller rejects a new access request to the disk apparatus 500$x$ and stops the management of the disk apparatus 500$x$. With the conventional disk array system having the shared cache, by changing the disk apparatus under the management by some controller, the access amount to logical units of the disc apparatus under the management by the controller can be uniformalized so that load distribution by controllers is possible.

With the above-described conventional techniques, a disk may be mounted or dismounted to change the physical position of the disk to realize load distribution. In this case, the controller stops an access to the subject disk and completely disconnects the disk from the system, and when the disconnected disk is moved to a physically different position, the disk is again recognized to resume the process. With the above-described conventional techniques, a disk may be moved to a different disk apparatus. Therefore, the re-recognized disk is assigned to another new controller to allow load distribution.

SUMMARY OF THE INVENTION

If the above-described conventional techniques are applied to a disk array apparatus having a shared cache, the disk array apparatus operates finely. However, the conventional techniques cannot be applied to a disk array apparatus of the type that each controller has its own cache.

In a disk array system in the distributed cache environment wherein each controller has an independent and dedicated cache, each controller manages each volume by using the dedicated cache. Therefore, access concentration upon the shared cache environment can be avoided and cost performance and scalability can be improved.

However, in the disk array system in the distributed cache environment wherein each controller has an independent and dedicated cache, even if a disk apparatus under the management of one controller is to be switched to another controller, this switching is impossible because the destination controller has input/output data of volumes to be switched.

This problem can be solved if the same contents are written in the data caches of all controllers, and the take-over of volumes becomes possible similar to the shared cache. However, data of volumes not managed by each controller is also written in each cache. Therefore, the cache capacity is lowered and the merit of distributed caches is lost.

The disk array system of the type that each controller has an independent and dedicated cache, is associated with the problem that automatic and dynamic switching of disks cannot be performed. Namely, the disk array system in the distributed cache environment requires a manual work of disconnecting a disk from the system, a manual work of changing the physical position of the disconnected disk and a manual work of re-recognizing the disk. During these manual works, an access to the disk is required to be completely stopped. Moving the disk to the original position has not been taken into consideration.

As described above, the conventional disk array system of the type that each controller has an independent and dedicated cache is associated with the problem that a current in-charge controller cannot be replaced dynamically unless the system is stopped.

It is an object of the present invention to solve the above-described problems and provide a disk array system of the type that each controller has an independent and dedicated cache and takes charge of respective volumes, the system allowing any controller to dynamically take over a desired volume of another controller, and a method and apparatus for taking over logical units between controllers.

According to one aspect of the present invention, there is provided a disk array system having at least one or a plurality of computers and a disk array apparatus to be used by the computer, the disk array apparatus having a plurality of disk apparatuses and a plurality of controllers each having a dedicated cache, wherein: the controller comprises configuration management means for managing configuration information of logical units formed for the disk apparatus, the configuration management means rewrites the configuration information of the logical units in accordance with control information to perform a take-over process of switching a desired logical unit or units under control of one controller to another desired controller or controllers.

According to another aspect of the present invention, there is provided a take-over method for logical units between controllers in a disk array system having at least one or a plurality of computers and a disk array apparatus to be used by the computer, the disk array apparatus having a plurality of disk apparatuses and a plurality of controllers each having a dedicated cache, the method comprises the steps of: making the controller manage configuration information of logical units formed for the disk apparatus; and by rewriting the configuration information of the logical units in accordance with control information, performing a take-over process of switching a desired logical unit or units under control of one controller to another desired controller or controllers.

Other objects, features and advantages of the present invention will become apparent from the following description of the embodiments of the invention taken in conjunction with the accompanying drawings.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing an example of the structure of a configuration information table possessed by configuration management means of the embodiment shown in FIG. 1.

FIGS. 5A and 5B are diagrams showing an example of the configuration information tables before and after take-over according to the embodiment.

FIGS. 9A and 9B are diagrams showing an example of the configuration information tables before and after take-over according to the second embodiment.

DETAILED DESCRIPTION OF THE EMBODIMENTS

Embodiments of a disk array apparatus according to the invention will be described in detail with reference to the accompanying drawings.

Figure 1:
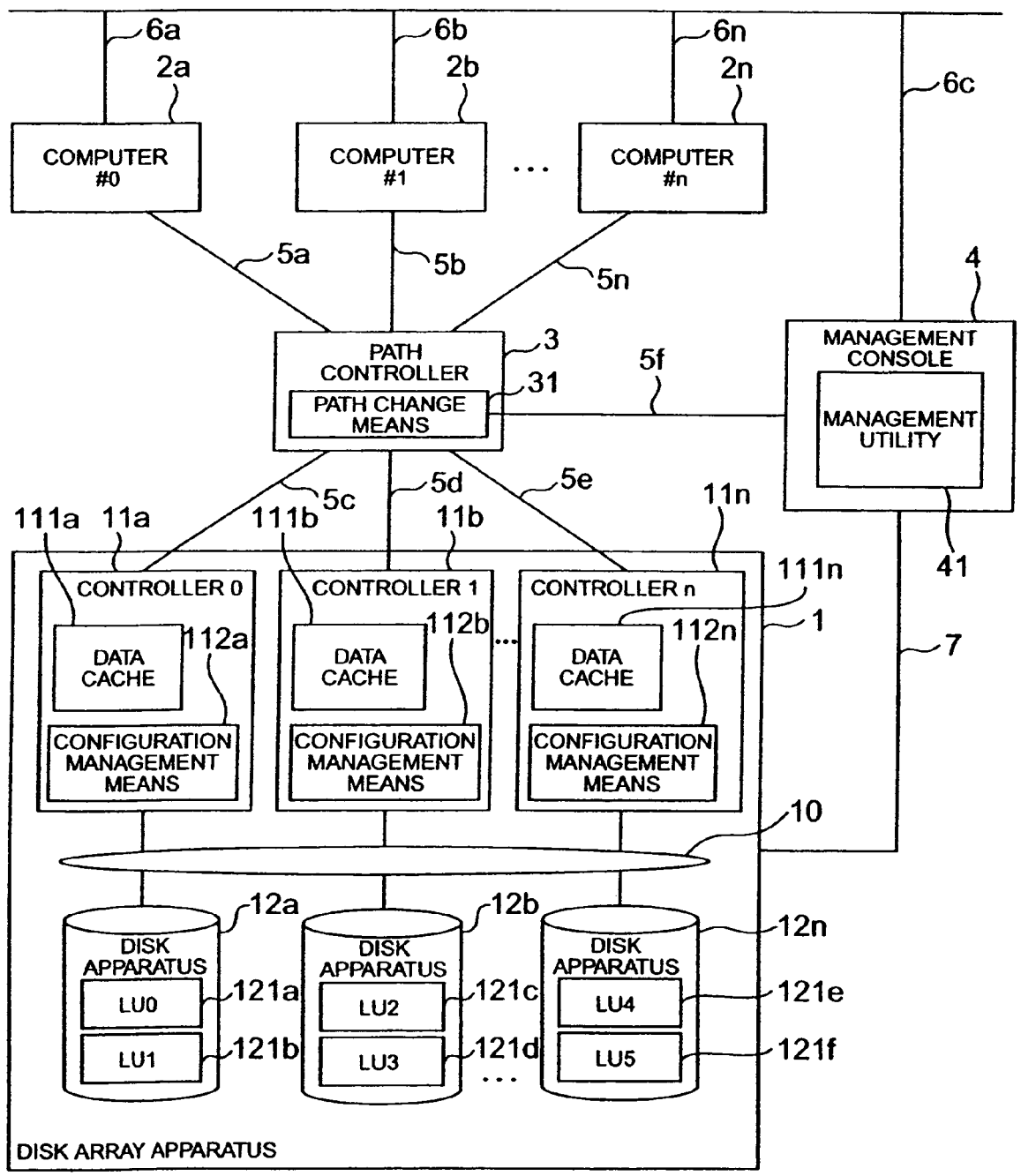
FIG. 1 is a block diagram showing the configuration of a disk array system according to a first embodiment of the invention.

FIG. 1 is a block diagram showing the configuration of a disk array system according to the first embodiment of the invention, and FIG. 2 is a diagram showing an example of the structure of a configuration information table possessed by configuration management means. In FIGS. 1 and 2, reference numeral 1 represents a disk array apparatus, reference symbol 2x (x=a, b, . . . , n) represents computers, reference numeral 3 represents a path controller, reference numeral 4 represents a management console, reference symbol 5x (x=a, b, . . . , n) represents channel paths, reference symbol 6x (x=a, b, . . . , n) represents local area networks (LAN), reference numeral 7 represents communication means, reference numeral 10 represents a device network, reference symbol 11x (x=a, b, . . . , n) represents controllers, reference symbol 12x (x=a, b, . . . , n) represents disk apparatuses each including general disks of, for example, 144 GB, reference numeral 31 represents path change means, reference numeral 41 represents a management utility, reference symbol 111x (x=a, b, . . . , n) represents data caches, reference symbol 112x (x=a, b, . . . , n) represents configuration management means, and reference symbols 121a to 121f represent logical units (LU).

As shown in FIG. 1, in the first embodiment of the invention, the disk array apparatus 1, a plurality of computers 2x using the disk array apparatus 1, the path controller 3 for interconnecting all the computers 2x, the disk array apparatus 1 and management console 4, and the management console 4 for managing the disc array apparatus 1 are interconnected by the channel paths 5x. In the example shown in FIG. 1, fiber channels are used as the channel paths. This embodiment provides LAN 6x for communications between the computer 2x and management console 4 and the communication means 7 for communications between the disk array apparatus 1 and management console 4.

The path controller 3 has the path change means which is a program for changing an access path from the computer 2x to disk array apparatus 1. In the example shown in FIG. 1, although the path change means 31 is installed in the path controller 3, a similar function may be installed in the computer 2x.

The management console 4 has the management utility 41 which is used by a system administrator to display the LU configuration of LU's in the disk apparatus 12x of the disk array apparatus 1, to set and diagnose LU's in the disk array apparatus 1 and to perform other operations. Although the management utility 41 having a function of designating an LU take-over destination controller or switch-destination controller is installed in the management console 4, it may be installed in the computers 2x and disk array apparatus 1. Control information for designating the destination controller may be generated by the disk array apparatus.

The disk array apparatus 1 has a plurality of controllers 11x and a plurality of disk apparatuses 12x interconnected by the device network 10. With this arrangement, any controller can access any disk apparatus. Although the device network 10 may be configured by any interface, it is preferable to use fiber channels excellent in connectivity. In order to improve the total throughput, the device network may be configured by one or a plurality of switches.

The controller 11x has the data cache 111x and configuration management means 112x. The data cache temporarily stores input/output data including data written by the computer 2 and data read from the disk apparatus 12x. The configuration management means 112x manages the configuration of disks and LU's. LU (logical unit) is a virtual logical volume set in the disk array apparatus 1. This name LU is defined by the small computer system interface (SCSI) which is one of the protocols for interface between the computer 2 and disk array apparatus. The number for identifying LU is called a logical unit number (LUN) or logical volume number.

LU defined in the disk array apparatus 1 is called an internal logical volume (internal LU). In order to manage the internal LU, the disk array apparatus 1 affixes integer serial numbers starting from 0 to LU's. This serial number is called an internal logical volume number (internal LUN). In detecting LU, the computer 2x sequentially searches LUN's starting from 0, and if the target number does not exist, the computer stops the search of the following serial numbers in some cases. In this case, the internal LUN is not assigned to the computer 2x, but it is necessary to convert the internal LUN into LUN capable of recognized by the computer 2x. LUN capable of recognized by each computer 2x is called an external logical volume (external LUN) to distinguish from the internal LUN.

The logical volumes LU 121x (121a, 121b, 121n) are generated on the respective disk apparatuses 12x. The logical volumes LU 121x may use any RAID structure. When the logical volume LU is generated, the controller taking charge of LU is assigned. A plurality of LU's may be assigned to one controller.

In the disk array system having the configuration shown in FIG. 1, each controller 11x has a dedicated data cache 111x and takes charge of respective LU's. It is therefore possible to prevent concentration of accesses upon a particular data cache. As compared to the system using a shared cache, cost performance and scalability can be improved.

FIG. 2 shows an example of a configuration information table 1121x possessed by the configuration management means 112x. The configuration information table 1121x is used for managing the configuration information of each LU 121x. This table stores internal LUN's, external LUN's, port numbers, controller numbers, block numbers, RAID group numbers, RAID levels, physical address information and the like. This configuration information table 1121x may be stored at a physically different position, i.e., in the disk apparatus 12x at a predetermined position.

The port number is the identification number of the port usable by LU, among fiber channel connection ports of the controller 11x. The controller number is the identification number of each controller in the disk array apparatus 1. A default controller number indicates the original controller which should take charge of LU. A current controller number indicates the controller which currently takes charge of LU. The block number indicates the number of logical blocks of LU. The size of each LU can therefore be known from the block number.

The disk array apparatus 1 may manage therein LU's of the same RAID level. The RAID group number and RAID level are the identification number of the RAID group and its level. The physical address information is physical disk position information corresponding to the logical address of each LU.

Figure 3:
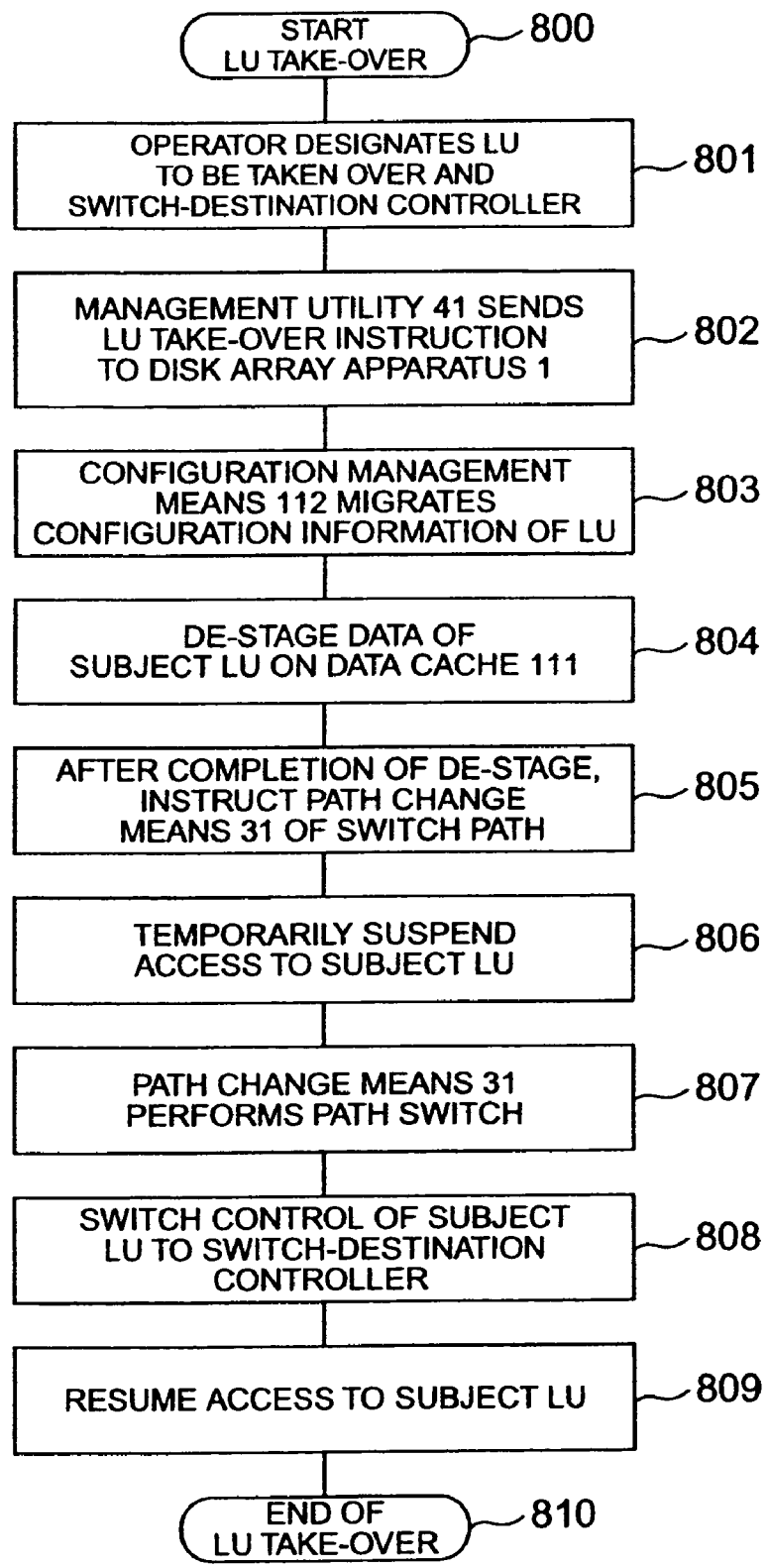
FIG. 3 is a flow chart illustrating an LU take-over process between controllers according to the embodiment.

FIG. 3 is a flow chart illustrating a take-over process for LU between controllers. The take-over process for LU between controllers will be described.

(1) An operator of the management console 4 designates LUN's of all LU's to be switched and a switch-destination controller. In this case, if the port number and external LUN to be used by the switch-destination controller is to be changed, the new port number and external LUN are also designated. (Step 801)

(2) The management utility 4 issues an LU take-over instruction to the disk array apparatus 1 via the communication means 7 in accordance with the designated information. (Step 802)

(3) Upon reception of the LU take-over instruction, the configuration management means 112x of the switch-source controller 11x migrates the configuration information of the subject LU to the switch-destination controller 11x. More specifically, the configuration management means 112x of the switch-source controller 11x writes the field of the subject LU in the configuration information table 1121x into the corresponding disk at a predetermined position, and the configuration management means 112x of the switch-destination controller 11x reads the written field to migrate the configuration information to the switch-destination controller 11x. If the port number and external LUN are to be changed, the configuration management means 112x of the switch-source controller 11x changes the contents of the configuration information table 1121x and writes the changed contents in the disk. Migration of the configuration information is performed by transmitting it via the device network 10. The configuration information may be directly transmitted via an unrepresented private line. It is obvious that the configuration management means 112x of all the controllers 11x may store in advance the configuration information of all LU's in the configuration information tables 1121x. In such a case, migration of the configuration information can be omitted, and only the port number, external LUN and controller number are changed. (Step 803)

(4) Next, the switch-source controller 11x de-stages all data of the subject LU loaded in the data cache 111x. The de-stage process is a process of writing data on the data cache into the disk. During this process, all write accesses from the computer 2x are made write-through. In this manner, all data of the subject LU can be removed from the data cache and the coherence of the contents of LU on the disk can be maintained. The de-stage process may be performed in response to a write command from the management console 4. (Step 804)

(5) After the de-stage process for the subject LU is completed, the switch-source controller 11x notifies a de-stage completion to the management utility 41. Upon reception of the de-stage completion, the management utility 41 instructs the pass change means 31 to switch a path. (Step 805).

(6) Upon reception of this path switch instruction, the path change means 31 temporarily suspends an access to the subject LU in order to suppress an access in the transient period during the LU take-over. (Step 806)

(7) Next, the path change means 31 changes an access path to the subject LU from the switch-source controller to the switch-destination controller. All frames to the subject LU are therefore transmitted to the switch-destination controller. (Step 807)

(8) Next, the controller for controlling the subject LU is switched to the switch-destination controller. The switch-source controller completely stops an access to the subject LU, whereas the switch-destination controller starts controlling the subject LU. (Step 808)

(9) After the switching of the control is completed, the path change means 31 resumes an access to the subject LU. (Step 809)

With these Steps, the LU take-over process is completed. With these Steps, the data of the subject LU on the data cache is de-staged to maintain the coherence of the contents of the disk. Even if each controller has a dedicated cache, take-over of volumes can be performed between desired controllers without suspending the system.

Figure 4A:
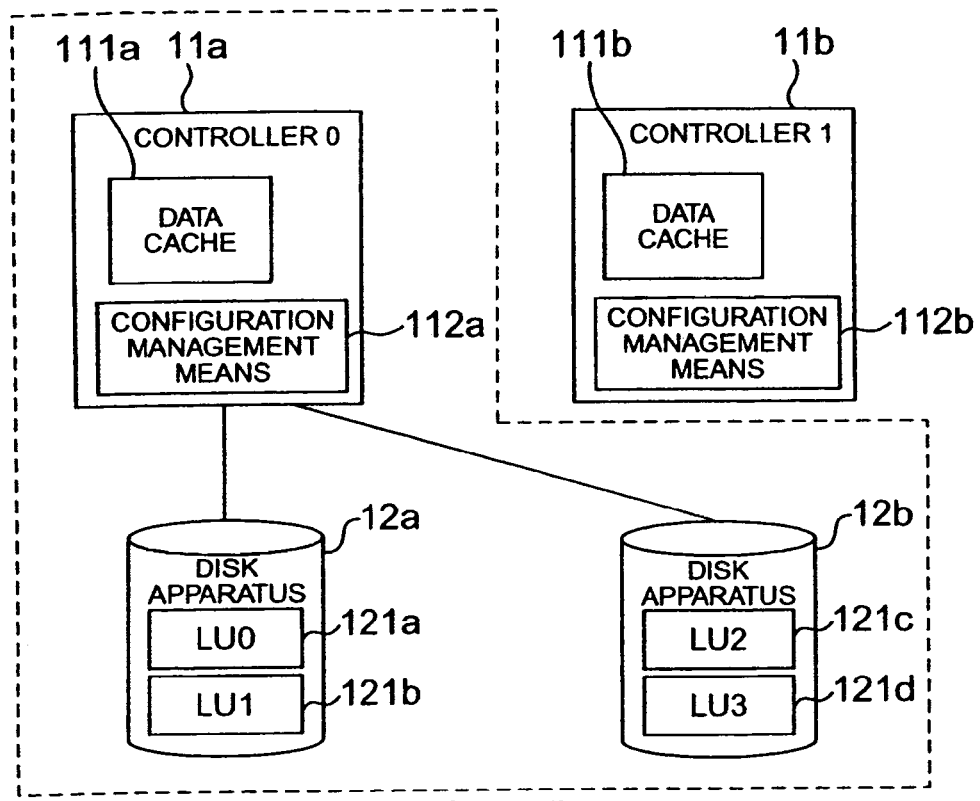
FIGS. 4A and 4B are diagrams showing a specific example of the LU take-over described with reference to FIG. 3.
Figure 4B:
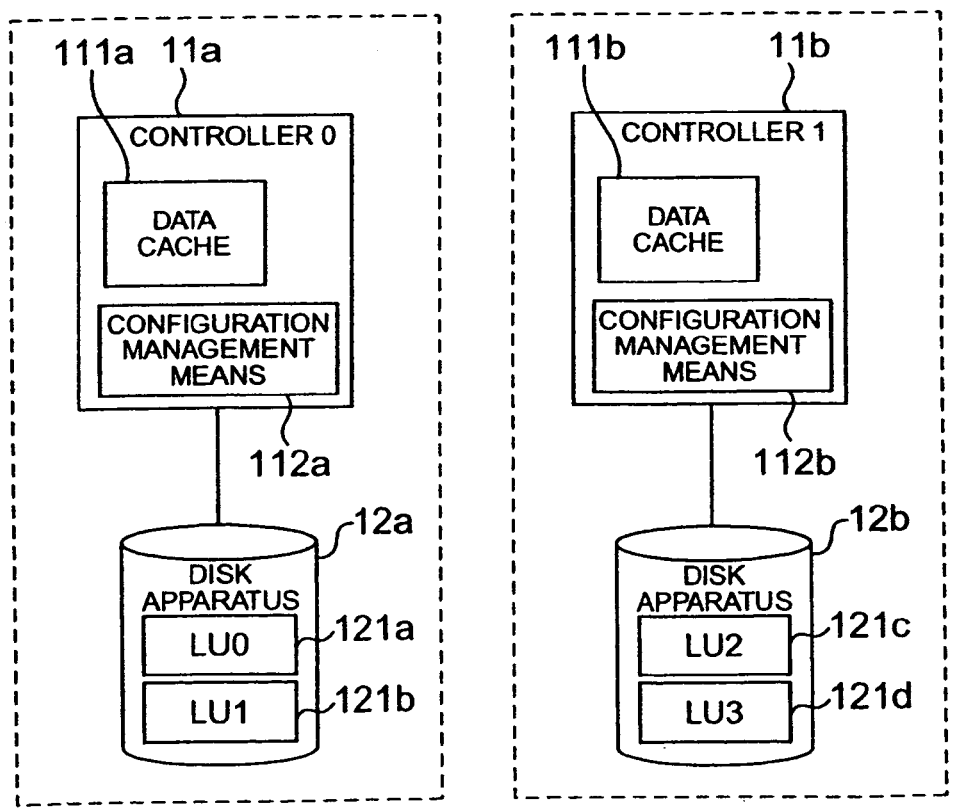

FIGS. 4A and 4B are diagrams showing a specific example of the LU take-over described with reference to FIG. 3. With reference to FIGS. 4A and 4B and FIGS. 5A and 5B, a specific example of the LU take-over and rewriting the configuration information table will be described.

It is assumed as shown in FIG. 4A that some computer 2x uses LU0 121a to LU3 121d assigned to the controller 0 11a. It is also assumed as shown in FIG. 4B that the controller 1 11b is added to switch the control of LU2 121c and LU3 121d to the controller 1 11b. It is assumed in this case that the external LUN is not changed but only the port number is changed. It is also assumed for the purpose of simplicity that all of the configuration management means 112x store the information of all LU's in the configuration information tables 1121x.

The configuration information tables 1121x before take-over of the switch-source and switch-destination controllers have the contents shown in FIG. 5A. The block number, RAID group number, RAID level, physical address information and the like are omitted in FIGS. 5A and 5B because they are not altered by take-over.

It can be understood from FIG. 5A that "0" representative of a current in-charge controller is stored as the default controller numbers and current controller numbers for all LU's and that LU0 and LU1 use the port number 0 and LU2 and LU3 use the port number 1.

An operator of the management console 4 selects LU2 121c and LU3 121d to be migrated and designates the port number "0" to be used by the switch-source controller 111b and switch-destination controller 111b. In accordance with the designated information, the contents of the configuration information tables 1121x are altered. Therefore, the contents of the configuration information tables 1121x become as shown in FIG. 5B. It can be understood from FIG. 5B that the port numbers of LU2 and LU3 are changed to "0" and the default controller number and current controller number are changed to "1". The switch-source controller and switch-destination controller refer to the configuration information tables and realize the logical unit configuration after a change in the contents. In the example of this embodiment, control of LU2, 121c and LU3 121d can be changed to the controller 1 11b.

According to the first embodiment of the invention, data of the subject LU on the data cache is de-staged to the disk to maintain the coherence of the contents of the disk. Therefore, even if each controller has a dedicated cache, take-over of volumes can be performed between desired controllers without suspending the system, and the load distribution of each controller in the system can be realized.

Figure 6:
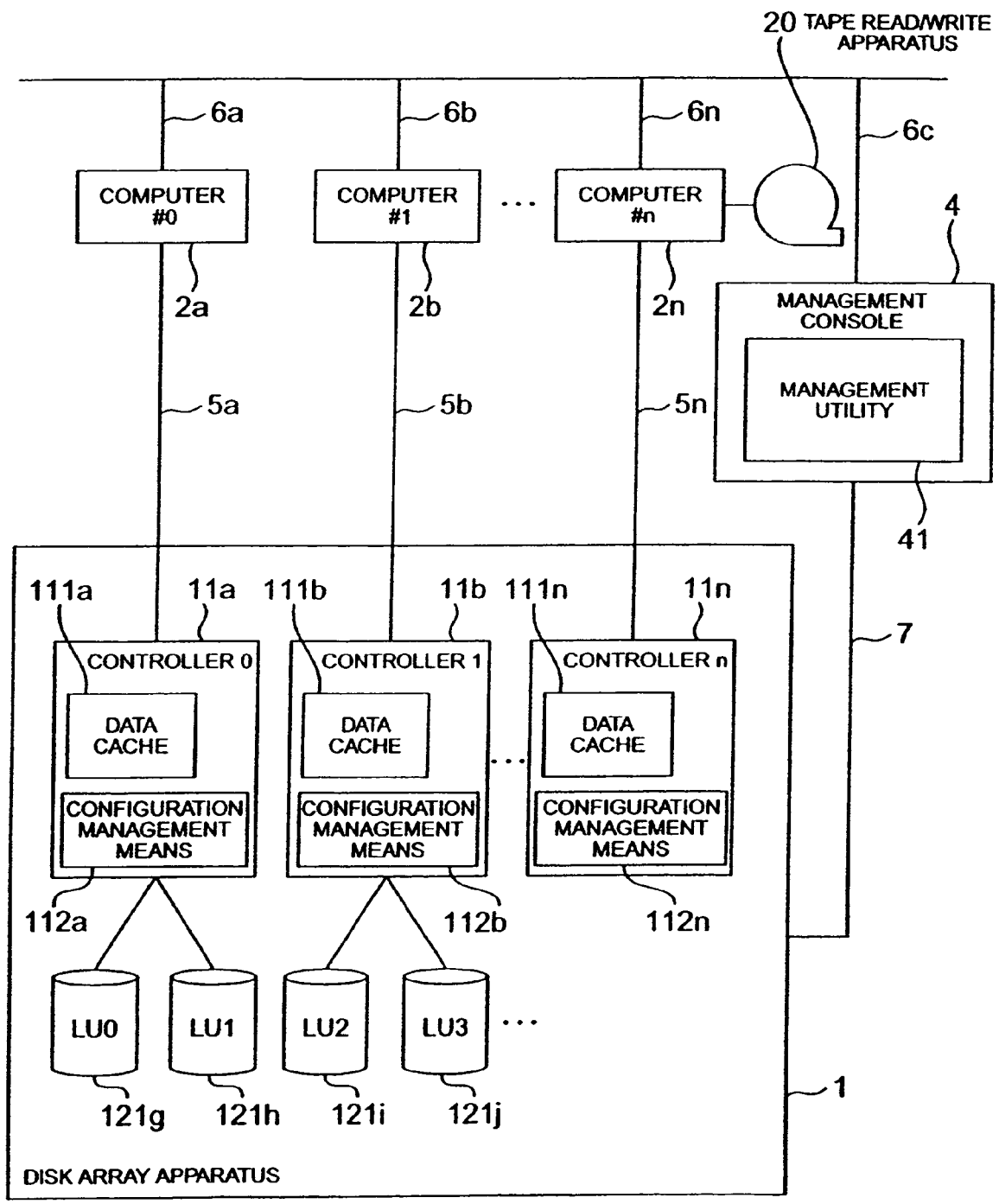
FIG. 6 is a block diagram showing the configuration of a disk array system according to a second embodiment of the invention.

FIG. 6 is a block diagram showing the configuration of a disk array system according to the second embodiment of the invention. In FIG. 6, reference numeral 20 represents a tape read/write apparatus, and other reference numerals are the same as those shown in FIG. 1.

Different points of the second embodiment of the invention shown in FIG. 6 from the first embodiment shown in FIG. 1 reside in that the computer 2n is connected to the tape read/write apparatus 20 and each computer 2x is directly connected to a corresponding controller 11x. Similar to the first embodiment, it is obvious that the computer 2x and controller 11x may be interconnected via a path controller. The second embodiment can omit the path change means. It is not necessary that the computer 2x and controller 11x are in one-to-one correspondence, but a plurality of computers may be connected to one controller.

The second embodiment of the invention shown in FIG. 6 has a data mirroring function and the computer 2n is used as a computer generally called a backup server for backing up the volumes in the disk array apparatus 1. The second embodiment of the invention is applicable not only to the backup process, but also to various processes such as batch processing and data mining. In the following description, it is assumed that the invention is applied to the backup process.

In the disk array system shown in FIG. 6, it is assumed that the controller 11a is assigned LU0 121g and LU1 121h and the controller 11b is assigned LU2 121i and LU3 121j. LU1 121h and LU3 121j are duplicates of LU0 121g and LU2 121i, respectively, and store the same contents as the data stored in LU0 121g and LU2 121i. A function of forming a duplicate of a volume in the disk array apparatus is generally called a data mirroring function.

Figure 7:
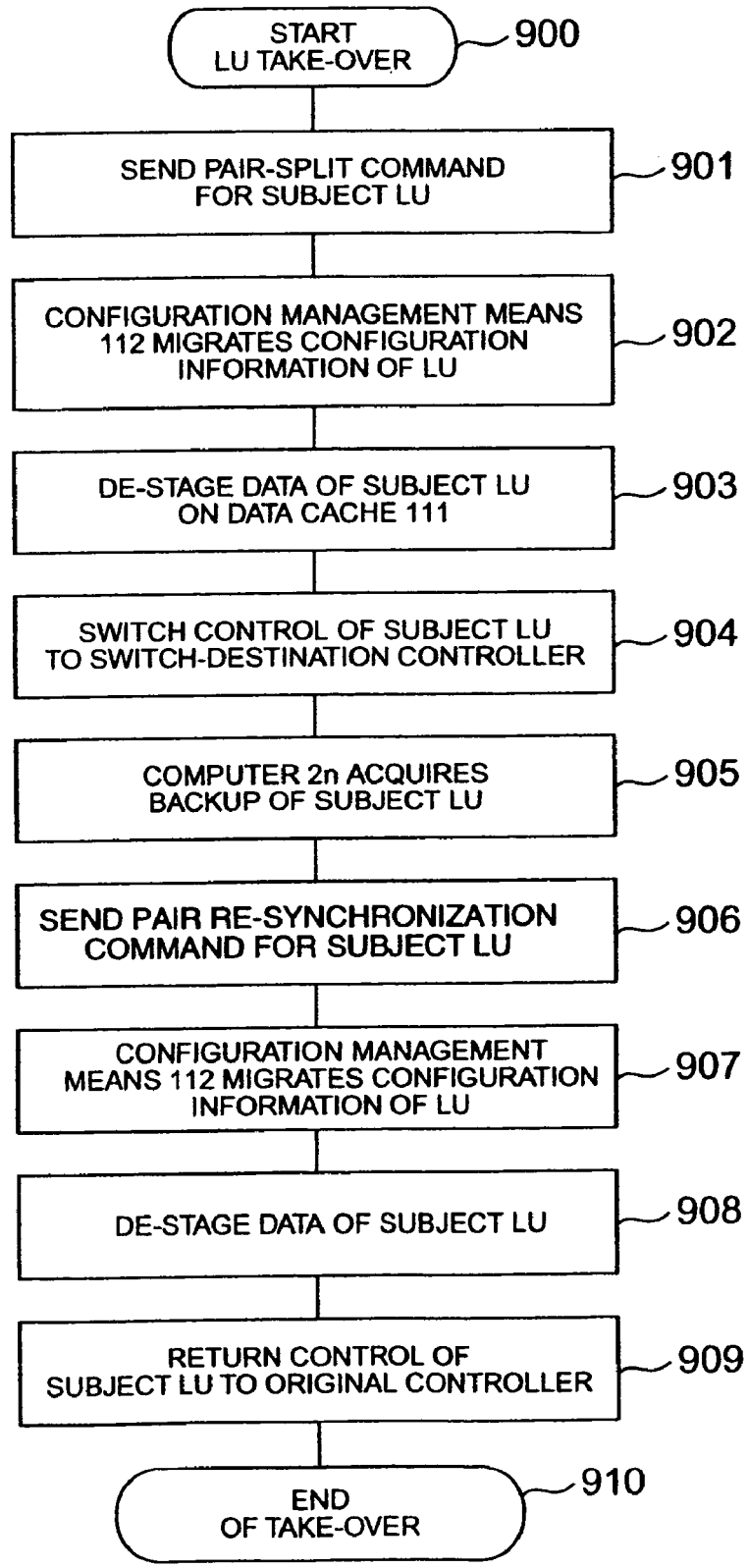
FIG. 7 is a flow chart illustrating an LU take-over process between controllers by using a data mirroring function according to the second embodiment.

FIG. 7 is a flow chart illustrating an LU take-over process for LU between controllers by utilizing the data mirroring function. This take-over process will be described. As an example of the take-over process, the case will be described wherein the computer 2n as the backup server backs up the contents of the duplicated LU into the tape read/write apparatus 20.

(1) First, the computer 2x sends to the disk array apparatus 1 a pair-split command for LU to be backed up. (Step 901)

(2) After the pair is split, the configuration management means 112x of the switch-source controller 11x in charge of the split LU's migrates the configuration information of the subject LU to the controller 11n designated by the default controller number in the configuration information table 1121x. For the migration, the default controller number is changed to the number of the switch-source controller. In addition to the configuration information, other necessary management information is also migrated, such as the status of LU to be used by the data mirroring function, difference information for writing LU write positions and the like. The migration method may be any method similar to the first embodiment. (Step 902)

(3) Next, the switch-source controller 11x de-stages all the data of the subject LU on the data cache 111x. During this de-stage process, all write accesses from the computer 2x are made write-through, and the data of the subject LU on the data cache 111x is removed. In this case, the computer 2x may issue a de-stage command for the subject LU. (Step 903)

(4) After the de-stage process is completed, the switch-source controller 11x notifies a de-stage completion to the switch-destination controller to change control of the subject LU to the switch-destination controller 11n. (Step 904)

(5) As the control of the subject LU is changed and it becomes possible for the switch-destination controller 11n to access the subject LU, the computer 2n stores data of the subject LU into the tape read/write apparatus 20 or the like to back up the subject LU. (Step 905)

(6) After the backup is completed, the backup computer 2n sends a pair re-synchronization instruction for the subject LU to the disk array apparatus 1. (Step 906)

(7) Upon reception of the pair re-synchronization instruction, similar to the process at Step 902 the configuration management means 112n of the controller 11n in charge of the control of the subject LU migrates the configuration information of the subject LU to the switch-destination controller 11x designated by the default controller number in the configuration information table 1121n. For the migration, the default controller number is changed to the number of the controller 11n. In addition to the configuration information, other necessary management information is also migrated, such as the status of LU to be used by the data mirroring function, difference information for writing LU write positions and the like. (Step 907)

(8) Next, similar to the process at Step 903, the backup controller 11n in charge of the control of the subject LU de-stages all data of the subject LU on the data cache 111n. During this period, all write accesses from the computer 2n are made write-through, and all data of the subject LU on the data cache 111n is removed. (Step 908)

(9) After the de-stage process is completed, the backup controller 11n in charge of the control of the subject LU notifies a de-stage process completion to the switch-destination controller 11x designated by the default controller number, and the control of the subject LU is returned to the original controller 11x to terminate the take-over process. (Step 909) According to the second embodiment of the invention, since the backup process is performed by a dedicated controller 11n, data can be backed up without influencing the performance of a normal operation system.

Figure 8A:
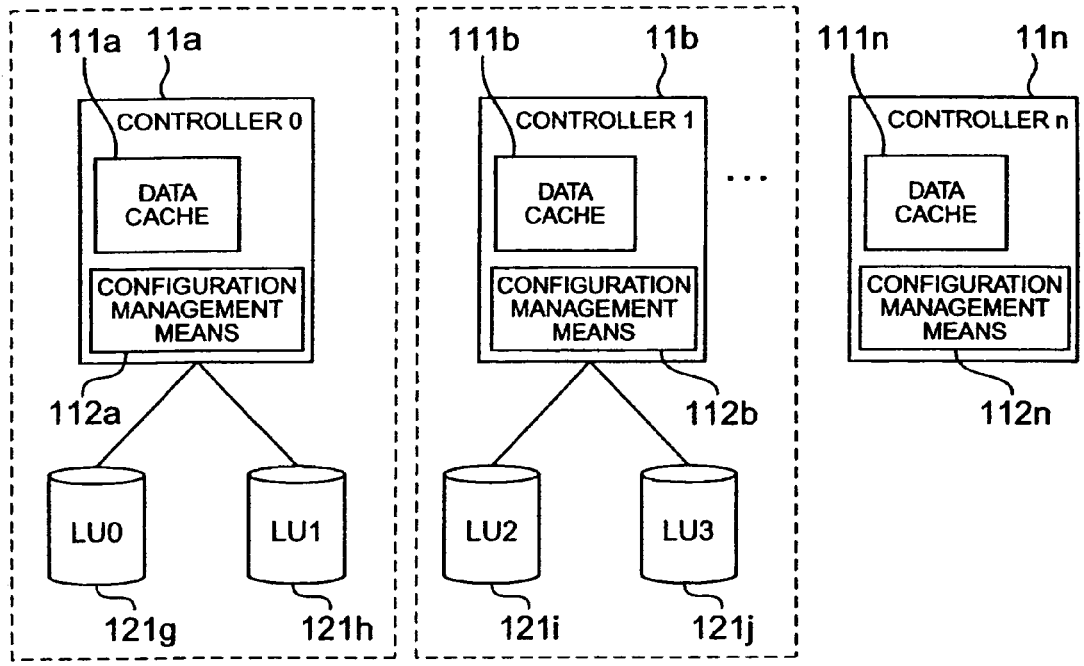
FIGS. 8A and 8B are diagrams showing a specific example of the LU take-over described with reference to FIG. 7.
Figure 8B:
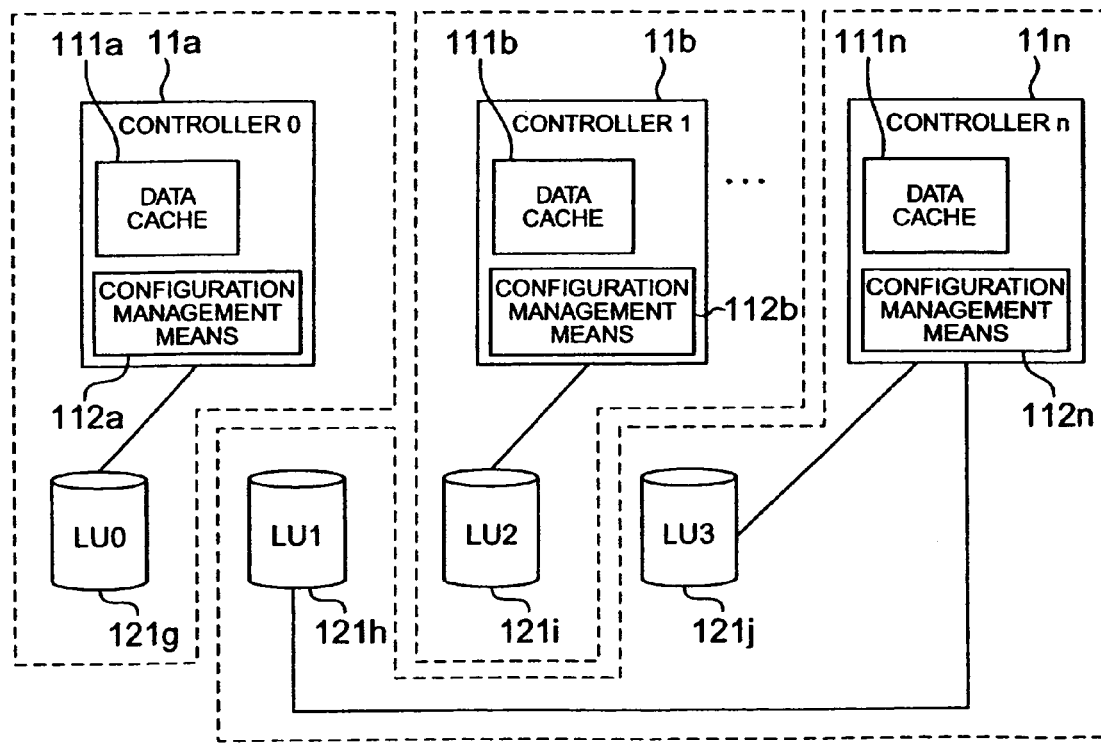
Figure 10:
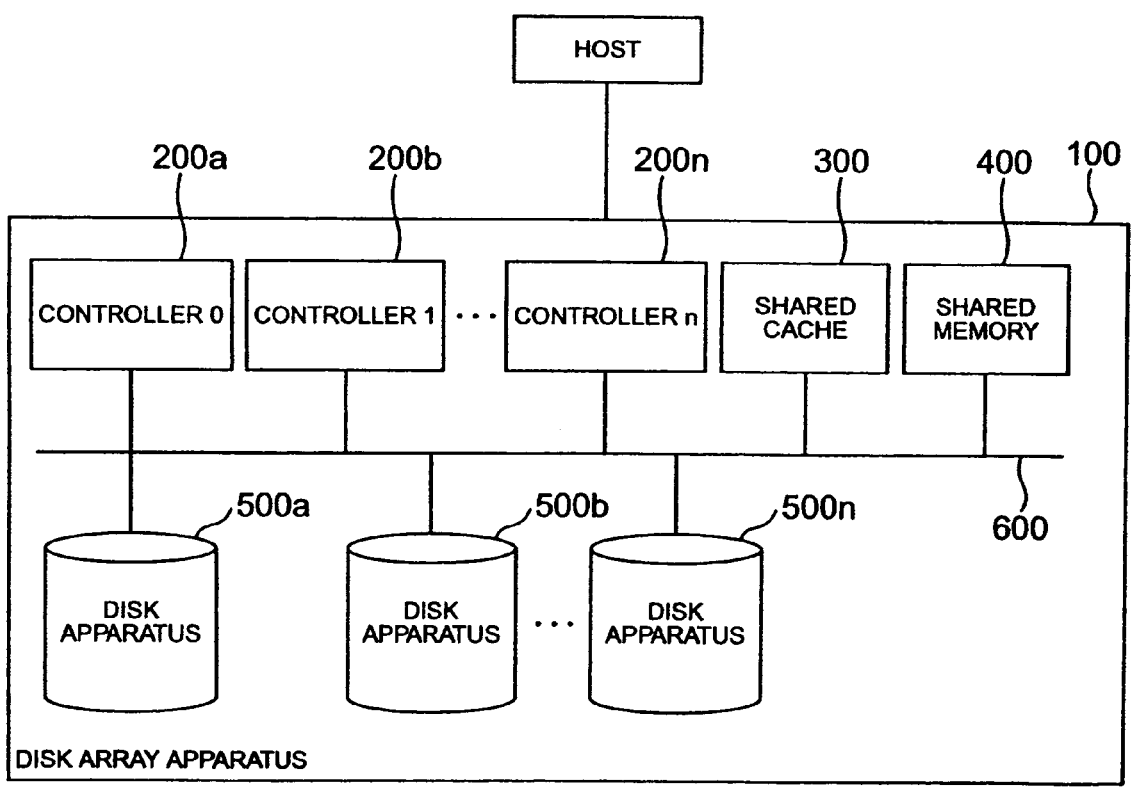
FIG. 10 is a block diagram showing the configuration of a disk array system with a shared cache according to the prior art.

FIGS. 8A and 8B are diagrams showing specific examples of the LU take-over described with reference to FIG. 7, and FIGS. 9A and 9B show examples of the configuration information tables before and after take-over. Next, with reference to FIGS. 8A and 8B and FIGS. 9A and 9B, a specific example of the LU take-over and rewriting the configuration information table will be described.

It is assumed as shown in FIG. 8A that the controller 0 11a is assigned LU0 121g and LU1 121h and the controller 1 11b is assigned LU2 121i and LU3 121j. It is also assumed as shown in FIG. 8B that the control of LU1 121h and LU3 121j is switched to the controller n 11n. It is assumed in this case that the external LUN and port number are not changed but they are used as they are. Similar to the first embodiment, it is assumed that all of the configuration management means 112x store the information of all LU's in the configuration information tables 1121x.

The configuration information tables 1121x before take-over have the contents shown in FIG. 9A. It can be understood from FIG. 9A that "0" is stored for LU0 and LU1 and "1" is stored for LU2 and LU3, indicating the controller number of a current in-charge controller. As the default controller number for LU1 and LU3, "n" representative of the switch-destination controller is stored.

It can be understood from the configuration information table of FIG. 9A that the configuration management means 112a of the switch-source controller 0 11a and the configuration management means 112b of the switch-source controller 1 11b can know that the controller n 11n represented by the default controller number is the switch-destination controller. Therefore, the contents of the configuration information table after take-over become as shown in FIG. 9B. It can be understood from this table that the default controller numbers of LU1 and LU3 are changed to "0" and "1", respectively. The controller in charge of the control after take-over is the controller n and the current controller numbers are changed to n.

After the backup process is completed by changing the controllers, the controller performs migration along a direction opposite to the first migration. In this case, similar to the first migration, the configuration management means 112n of the controller n 11n can know the switch-destination controllers from the default controller numbers in the configuration information table 1121n. It is therefore possible to automatically switch the control of LU's to the original controllers. The controllers and LU assignment when the LU control is switched to the original controllers are the same as those shown in FIG. 8A. When the control of the subjects LU's is switched to the original controllers, the default controller numbers of the subject LU's in the configuration information table 1121x are changed to n. The contents of the configuration information table are the same as those shown in FIG. 9A. It can be understood from FIG. 9A that the default controller numbers of LU1 and LU3 are again changed to n. The LU take-over can be repetitively performed in the manner described above.

According to the second embodiment, the backup process is performed by using the dedicated controller so that LU's can be backed up without influencing the performance of the normal operation system. By storing the controller numbers of the switch-destination controllers in the configuration information table, it becomes possible to automatically take over LU's and automatically return the control to original controllers to thereafter continue the normal process.

As described so far, according to the present invention, even if each controller has an independent and dedicated cache, desired LU's can be taken over switching between desired controllers without suspending the system and load distribution of each controller in the system becomes possible.

According to the present invention, automatic volume take-over and returning the control to original controllers are possible. Accordingly, the backup process can be performed by using a dedicated controller, and LU's can be backed up compatibly with the normal operation system.

It should be further understood by those skilled in the art that the foregoing description has been made on embodiments of the invention and that various changes and modifications may be made in the invention without departing from the spirit of the invention and the scope of the appended claims.

What is claimed is:

1. A data storage system comprising:
at least one computer; and
a memory system to be used by said at least one computer;
said memory system comprising:
a first controller having a first dedicated cache;
a second controller having a second dedicated cache; and
a plurality of disk apparatuses coupled to said first controller and to said second controller;
said first controller operative to control a plurality of first logical units defined among said disk apparatuses,
said second controller operative to control a plurality of second logical volumes defined among said disk apparatuses,
said first controller and said second controller operative to manage configuration information of said first logical volumes and said second logical volumes,
said first controller operative to change said configuration information to transfer control of at least one of said first logical volumes to said second controller.

2. A data storage system according to claim 1 further comprising a path control unit configured to provide access between said at least one computer and said logical volumes, wherein when said first controller transfers control of said at least one of said first logical volumes to said second controller, said path control unit provides access between said at least one computer and said second controller in order to access said at least one of said first logical volumes.

3. A data storage system according to claim 2, wherein said path control unit switches an access path of said at least one of said first logical volumes from said first controller to said second controller.

4. A data storage system according to claim 3, wherein after an access path of said at least one of said first logical volumes is switched from said first controller to said second controller, said path control unit resumes access from said at least one computer to said at least one of said first logical volumes.

5. A data storage method in a storage system comprising a plurality of logical volumes, the method comprising:
in a first controller, controlling a plurality of first logical volumes to service data access requests from a first computer;
in a second controller, controlling a plurality of second logical volumes to service data access requests from said first computer;
managing configuration information of said first logical volumes and said second logical volumes;
modifying said configuration to transfer control of at least one of said first logical volumes to said second controller, wherein said second controller subsequently controls said at least one of said first logical volumes to service data access requests from said first computer.

6. A data storage method according to claim 5 further comprising, in response to a data access request from said first computer to access said at least one of said first logical volumes, directing said data access request to said second controller subsequent to said first controller transferring control of said at least one of said first logical volumes to said second controller.

7. A data storage method according to claim 6 further comprising switching an access path of said at least one of said first logical volumes from said first controller to said second controller.

* * * * *